J. CARPENTER.
APPARATUS FOR PICKLING GRAIN.
APPLICATION FILED OCT. 21, 1908.

917,712.

Patented Apr. 6, 1909.

UNITED STATES PATENT OFFICE.

JOSEPH CARPENTER, OF OAK LAKE, MANITOBA, CANADA.

APPARATUS FOR PICKLING GRAIN.

No. 917,712.  Specification of Letters Patent.  Patented April 6, 1909.

Application filed October 21, 1908. Serial No. 458,840.

*To all whom it may concern:*

Be it known that I, JOSEPH CARPENTER, a subject of the King of Great Britain, residing in the town of Oak Lake, in the Province of Manitoba, Canada, have invented certain new and useful Improvements in Apparatus for Pickling Grain, of which the following is a specification.

My invention relates to improvements in apparatus for pickling grain, and one object of my invention is to prevent the wastage of the chemical liquid used in pickling the grain.

Another object of my invention is to provide an apparatus of the class set forth whereby a kernel or seed will be treated with the chemical liquid by reason of the uniform permeation of the said liquid through the body of grain immersed therein for the purpose of cleaning the same of smut or any other undesirable substance which may be present therein.

Another object of my invention is to enable the grain to be removed from the apparatus freed from superfluous moisture; and a still further object of my invention is to provide a device of the class set forth whereby all kinds of grain can be pickled without making the slightest modification in the apparatus.

Another object of my invention is to construct an apparatus of the class described so that the means for operating the basket or the grain receptacle, and the said grain receptacle depending from said means, will move around a common hinged point, thereby providing a construction which will enable me to obtain any desired leverage so that there will be no difficulty whatever in removing the grain from the pickle. When the grain, such as wheat, oats, barley, or other grain, has been thoroughly pickled, the weight of the pickled grain in the grain receptacle is consequently very much increased, and it is very desirable to have an apparatus of the class described which can be easily manipulated, as will be readily understood by one skilled in this art.

The construction of my device, and its operation, will be hereinafter particularly set forth, and the parts I claim as new will be pointed out in the claim forming part of this application.

Figure 1:
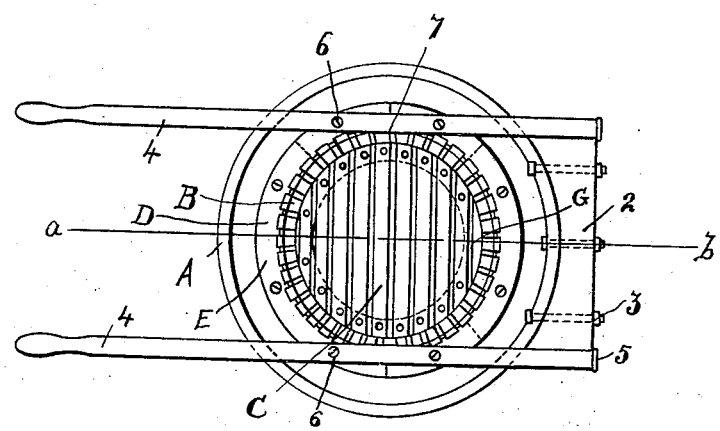
Figure 2:
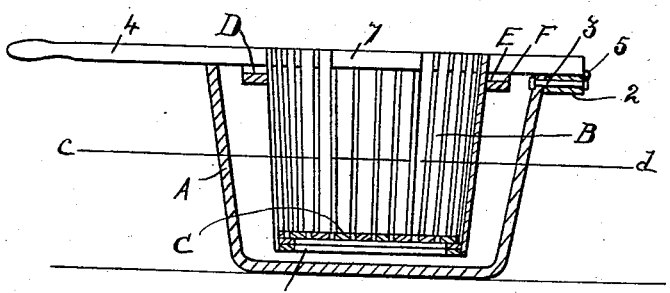
Figure 3:
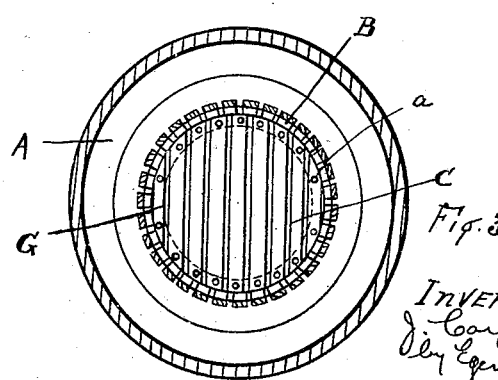

Figure 1 is a plan-view of my apparatus. Fig. 2 is a vertical central section on the line $a$—$b$, Fig. 1, and Fig. 3 is an enlarged horizontal cross-section on the line $c$—$d$, Fig. 2, the device being shown in full horizontal section.

In the drawings, like characters of reference indicate corresponding parts in each figure.

The tub or receptacle A may be of any suitable construction, and the same is designed to contain the pickling liquid. The basket or sieve, which receives the grain to be pickled, is composed of a plurality of slats B which form the walls of the basket. C are a plurality of slats, which form the bottom of the said basket or sieve.

It will be noticed from the drawings that the slats composing the basket or sieve are spaced apart so as to provide for the free and quick entry of the chemical liquid from the receptacle A into the mass of the grain so that each seed or kernel will be properly soaked. Although the spaces between the said slats are necessarily shown exaggerated in the drawings, still it will be understood that they are narrow enough to effectually prevent the grain from escaping from the basket or sieve. The said slats are supported in relative position by any suitable means, but my preferred construction for that purpose is as follows: D is the top ring made of wood, and comprises an upper ring E and a lower ring F, both composed of a plurality of sections bolted together so as to break joints, as clearly shown in Fig. 1. The bottom ring G is constructed the same as the ring D. This construction of rings gives me very stiff supports for the slats of the basket or sieve, and very effectually prevents warping of the slats through the action of the chemical liquid. It will be noticed that the top ring D fits around or incloses the upper ends of the slats B, and that the bottom ring G is surrounded by the lower ends of the slats B. The slats C rest upon and are secured to the bottom ring G. By any suitable fastening means, such as screws or nails $a$, the slats are secured in place.

A suitable frame is provided so that the basket or sieve may be manipulated very easily in order that the same may be removed from the receptacle A so to empty the grain therefrom. The said frame consists of a clamping-block 2 the inner side of which is made to conform to the outer configuration of the receptacle A. By means of any suitable fastening devices such as bolts and nuts 3, the said clamping block is secured to the said receptacle A.

4 are a pair of arms hinged at 5 to the clamping-block 2. By any suitable fastening means such as screws 6, the said arms are secured to the top ring D. Upon referring to Fig. 2, it will be seen that the underside of the arms 4 rest upon the top edge of the receptacle A as well as on the top of the clamping-block 2, and so support the basket or sieve within the receptacle A. In order to dump the pickled grain out of the said basket or sieve, it will be readily understood that this is accomplished by moving the arms 4 around the hinges 5 far enough to remove the said sieve or basket from the receptacle A, and turn it upside down. The grain will then fall upon the floor.

In order to strongly support the arms 4 to the receptacle A, I have found it necessary to cut off some of the slats B as shown at 7 level with the top of the top ring D. This construction is not absolutely essential, because the arms 4 can be formed with a curve to escape the said slats, as will be readily understood. When I secure the arms 4 in the position shown in the drawings to the top ring D, the slats B between the said arms will be cut off level with the top surface of said arms, and so not interfere with the capacity of the said basket or sieve.

From the foregoing specification it will be understood that my apparatus is simple in construction and consequently cheap to manufacture. From actual test it has been found to be very efficient, and that it does not require much power to manipulate the basket or sieve in order to dump the pickled grain therefrom.

By reason of the construction of the sieve or basket it will be readily seen that the surplus pickling liquid will readily drain back into the receptacle A so that when the grain is ultimately removed from the basket or sieve, there will be no wastage of liquid.

From the foregoing specification it will be understood that as the grain-receptacle, and the means or arms manipulating the same, have movement around a common hinged point, the apparatus will be stiff in its construction, that is, the parts are not liable to move independent of each other, and so are easily controlled in operation. It will be clearly understood that it is only necessary to increase the length of the arms 4, or other operating means, for the grain receptacle, to increase the leverage.

What I claim as my invention is:

In an apparatus of the class described, the combination with a liquid receptacle, of a grain-receptacle constructed of a plurality of slats spaced apart so as to permit of the free ingress and egress of the liquid; a supporting ring supported at the top of said grain-receptacle; a clamping-block carried by said liquid-receptacle; two arms supported on said liquid receptacle and to which the said grain-receptacle is secured by means of its upper supporting ring, and a hinged joint carried by said clamping-block and around which said arms and receptacle have movement.

In testimony whereof I have signed my name to this specification, in the presence of two subscribing witnesses.

JOSEPH CARPENTER.

Witnesses:
   JOHN G. LAMOND,
   R. J. GREY.